US008059794B2

(12) United States Patent
Fujiwara

(10) Patent No.: US 8,059,794 B2
(45) Date of Patent: Nov. 15, 2011

(54) SOUND DATA PROVIDING SYSTEM, METHOD THEREOF, EXCHANGE AND PROGRAM

(75) Inventor: Yu Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 1610 days.

(21) Appl. No.: 11/294,478

(22) Filed: Dec. 6, 2005

(65) Prior Publication Data

US 2006/0122824 A1 Jun. 8, 2006

(30) Foreign Application Priority Data

Dec. 7, 2004 (JP) ................................. 2004-354458

(51) Int. Cl.
*H04M 11/00* (2006.01)
*H04M 3/42* (2006.01)
(52) U.S. Cl. .................. 379/88.13; 455/414.4
(58) Field of Classification Search .................... 379/69, 379/88.22

See application file for complete search history.

(56) References Cited

U.S. PATENT DOCUMENTS

| | | | | |
|---|---|---|---|---|
| 4,856,066 | A * | 8/1989 | Lemelson | 704/275 |
| 5,146,487 | A * | 9/1992 | Bergsman et al. | 379/88.24 |
| 5,864,606 | A * | 1/1999 | Hanson et al. | 379/88.18 |
| 6,075,844 | A * | 6/2000 | Goldberg et al. | 379/88.17 |
| 6,154,788 | A * | 11/2000 | Robinson et al. | 710/8 |
| 6,385,584 | B1 * | 5/2002 | McAllister et al. | 704/275 |
| 6,385,586 | B1 * | 5/2002 | Dietz | 704/277 |
| 6,446,042 | B1 * | 9/2002 | Detlef et al. | 704/275 |
| 6,449,496 | B1 * | 9/2002 | Beith et al. | 455/563 |
| 6,519,458 | B2 * | 2/2003 | Oh et al. | 455/445 |
| 6,529,737 | B1 * | 3/2003 | Skinner et al. | 455/466 |
| 6,633,846 | B1 * | 10/2003 | Bennett et al. | 704/257 |
| 6,650,735 | B2 * | 11/2003 | Burton et al. | 379/88.01 |
| 6,658,389 | B1 * | 12/2003 | Alpdemir | 704/275 |
| 6,738,740 | B1 * | 5/2004 | Barash | 704/235 |
| 6,775,690 | B1 | 8/2004 | Creswell et al. | |
| 6,961,410 | B1 * | 11/2005 | Castagna | 379/88.23 |
| 7,756,255 | B1 * | 7/2010 | Santharam et al. | 379/69 |
| 2001/0049601 | A1 * | 12/2001 | Kroeker et al. | 704/254 |
| 2002/0132612 | A1 * | 9/2002 | Ishii | 455/414 |
| 2002/0172331 | A1 * | 11/2002 | Barker | 379/67.1 |
| 2002/0172339 | A1 * | 11/2002 | Creswell et al. | 379/201.01 |
| 2002/0184024 | A1 * | 12/2002 | Rorex | 704/255 |
| 2003/0050778 | A1 * | 3/2003 | Nguyen et al. | 704/235 |
| 2003/0083556 | A1 * | 5/2003 | Cosentino et al. | 600/300 |
| 2003/0156689 | A1 * | 8/2003 | Ando et al. | 379/88.01 |
| 2003/0163316 | A1 * | 8/2003 | Addison et al. | 704/260 |
| 2004/0010409 | A1 * | 1/2004 | Ushida et al. | 704/246 |
| 2004/0019487 | A1 * | 1/2004 | Kleindienst et al. | 704/270.1 |
| 2004/0054539 | A1 * | 3/2004 | Simpson | 704/270.1 |
| 2004/0249663 | A1 * | 12/2004 | Shishido | 705/1 |
| 2005/0170869 | A1 * | 8/2005 | Slemmer et al. | 455/575.1 |

FOREIGN PATENT DOCUMENTS

JP 3038435 U 6/1997

(Continued)

*Primary Examiner* — Joseph T Phan
(74) *Attorney, Agent, or Firm* — Dickstein Shapiro LLP

(57) ABSTRACT

A sound data providing system capable of improving the freedom of creation of sound data provided from a sending terminal to a receiving terminal, a method thereof, an exchange, and a program. A sending terminal transmits to a user interface information concerning the data of sound such as voice and digital sound, destination information and date information. The user interface converts the information received from the sending terminal to a format acceptable to an exchange to transmit the converted information to the exchange. The exchange provides a receiving terminal with the sound data at the specified date.

3 Claims, 5 Drawing Sheets

FOREIGN PATENT DOCUMENTS

| | | |
|---|---|---|
| JP | 10-065765 A | 3/1998 |
| JP | 2001-119486 | 4/2001 |
| JP | 2002-261944 A | 9/2002 |
| JP | 2004-236245 A | 8/2004 |
| KR | 10-2004-0044269 A | 5/2004 |
| WO | WO 02/01842 A1 | 1/2002 |

* cited by examiner

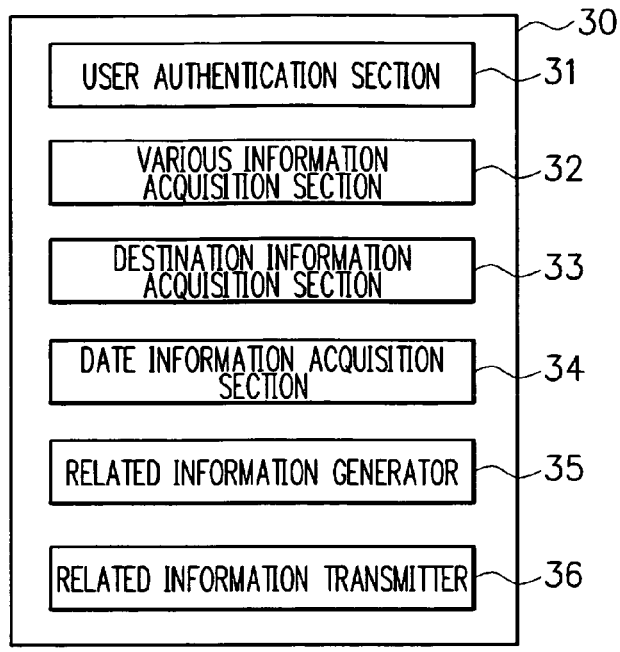
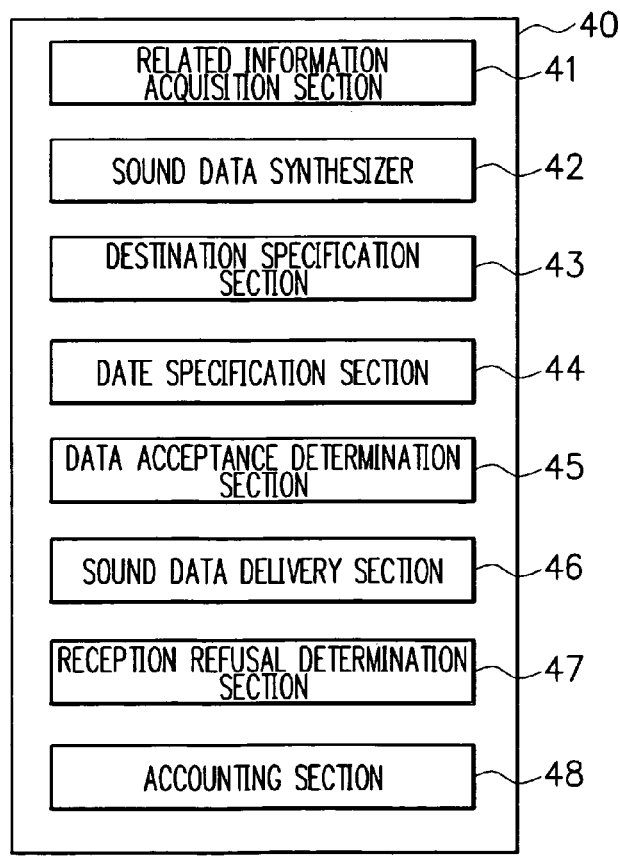

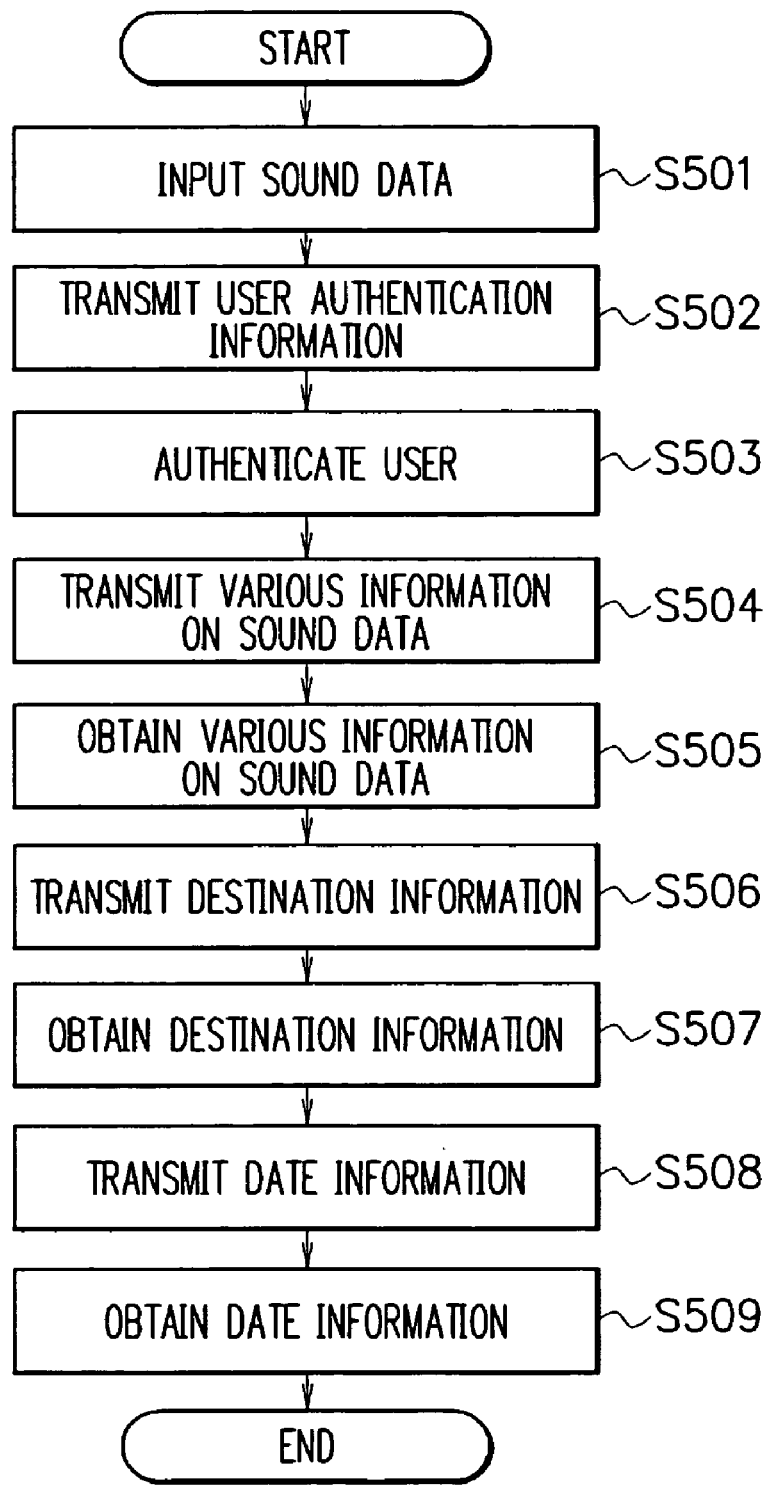

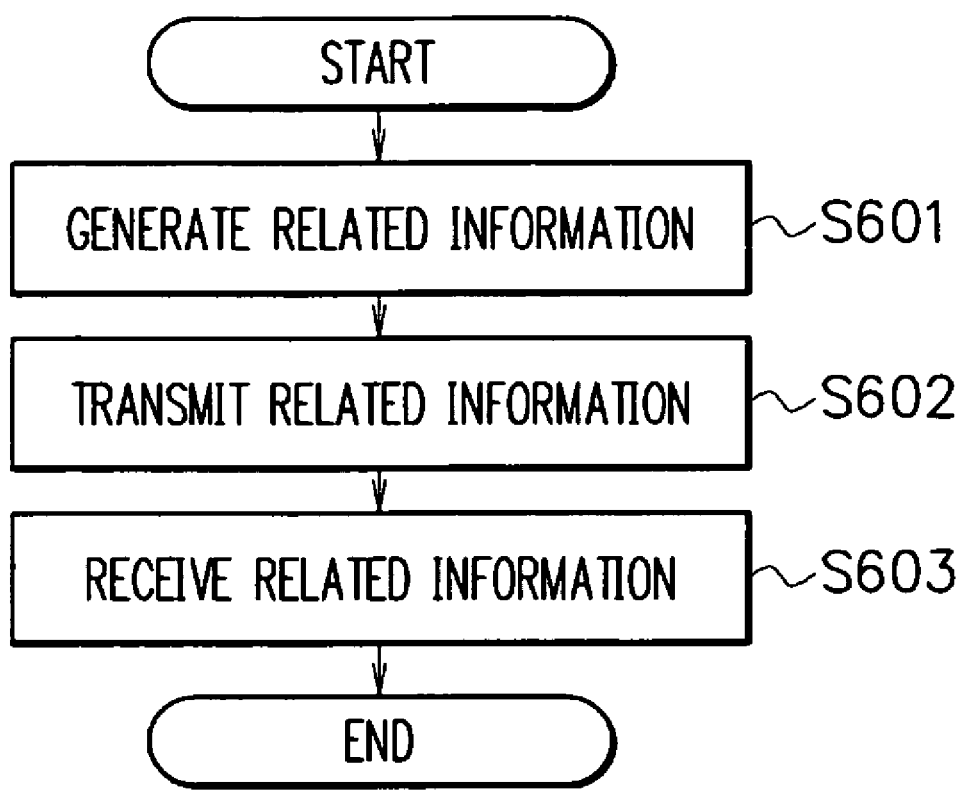

SOUND DATA PROVIDING SYSTEM, METHOD THEREOF, EXCHANGE AND PROGRAM

FIELD OF THE INVENTION

The present invention relates to a sound data providing system capable of delivering not only voice data but also various types of sound or audio data, a method thereof, an exchange, and a program.

BACKGROUND OF THE INVENTION

In the conventional telephone answering service, when a sending terminal makes a call through a communication network and a receiving terminal cannot answer it, the sender leaves a message, if necessary, following message acceptance guidance. After that, when the receiving terminal becomes available to answer a call, the receiver interrogates an exchange if any message has been left for him/her and receives the message.

Generally, the sender vocally inputs the message to the receiver through the mouthpiece of the sending terminal to register it with the exchange.

Besides, there have been proposed techniques for automatically distributing voice data. For example, Japanese Patent Application laid open No. 2001-119486 discloses a voice distribution service providing method. According to the method, a registrant of a voice distribution service stores a voice information file in a voice distributor through a terminal connected to a public network. A subscriber to the voice distribution service inputs in a user terminal such information as the code of voice data, the telephone number of a terminal where the voice data is to be delivered and the date of distribution to transmit the information to the voice distributor. Thereby, the voice distributor automatically distributes the designated voice data to the terminal with the designated telephone number at the designated date.

In the conventional telephone answering service, however, a message can be registered only through the mouthpiece of a sending terminal. Therefore, if a message is registered together with music as BGM, the sound of the music deteriorates to be unclear while the message is registered with the exchange through the mouthpiece of the terminal. Thus, there is a limitation on the freedom of message creation.

SUMMARY OF THE INVENTION

It is therefore an object of the present invention to provide a sound data providing system capable of improving the freedom of creation of sound data provided from a sending terminal to a receiving terminal, a method thereof, an exchange, and a program.

In accordance with the first aspect of the present invention, to achieve the object mentioned above, there is provided a sound or audio data providing system comprising a sending terminal for sending sound or audio data, an exchange and a receiving terminal for receiving the sound data, which are connected to one another. The sending terminal includes a sound data input section for inputting sound data, a various information transmitter for transmitting to the exchange various information on the sound data input through the sound data input section, a destination information transmitter for transmitting to the exchange destination information that specifies the receiving terminal where the input sound data is to be provided, and a date information transmitter for transmitting to the exchange date information that specifies the date (time and day) of delivery of the input sound data to the receiving terminal. The exchange includes a sound data synthesizer for synthesizing the sound data based on the various information on the sound data received from the sending terminal, and a sound data delivery section for delivering the sound data created by the sound data synthesizer to the receiving terminal at the specified date. The receiving terminal includes a sound data acquisition section for receiving the sound data from the exchange, and a sound data output section for outputting the sound data received by the sound data acquisition section.

In accordance with the second aspect of the present invention, there is provided a sound data providing system comprising a sending terminal for sending sound data, a user interface, an exchange and a receiving terminal for receiving the sound data, which are connected to one another. The sending terminal includes a sound data input section for inputting sound data, a various information transmitter for transmitting to the user interface various information on the sound data input through the sound data input section, a destination information transmitter for transmitting to the user interface destination information that specifies the receiving terminal where the input sound data is to be provided, and a date information transmitter for transmitting to the user interface date information that specifies the date of delivery of the input sound data to the receiving terminal. The user interface includes a related information generator for generating related information compatible with the exchange based on the various information, destination information and date information received from the sending terminal, and a related information transmitter for transmitting to the exchange the related information generated by the related information generator. The exchange includes a sound data synthesizer for synthesizing the sound data based on the various information on the sound data extracted from the related information received from the user interface, a destination specification section for specifying the receiving terminal where the sound data is to be provided based on the destination information extracted from the related information received from the user interface, a date specification section for specifying the date of delivery of the sound data based on the date information extracted from the related information received from the user interface, and a sound data delivery section for delivering the sound data created by the sound data synthesizer to the receiving terminal at the specified date. The receiving terminal includes a sound data acquisition section for receiving the sound data from the exchange, and a sound data output section for outputting the sound data received by the sound data acquisition section.

In accordance with the third aspect of the present invention, in the sound data providing system of the first or second aspect, the exchange further includes a data acceptance determination section for inquiring the receiving terminal whether or not it accepts the sound data to determine whether or not to provide the sound data thereto based on data acceptance information received therefrom as a response to the inquiry. The receiving terminal further includes a data acceptance information transmitter for transmitting to the exchange the data acceptance information as to whether or not to accept the sound data.

In accordance with the fourth aspect of the present invention, in the sound data providing system of one of the first to third aspects, the exchange and/or the receiving terminal further includes a reception refusal determination section for determining whether or not the sound data is acceptable based on identification information of terminals, sound data from which is to be refused, preset in the receiving terminal.

In accordance with the fifth aspect of the present invention, in the sound data providing system of one of the first to fourth aspects, the exchange further includes an accounting section for calculating fees charged to the sending terminal based on data amount, access time to a communication channel and the like with respect to the sound data provided to the receiving terminal, and charging the sending terminal the fees.

In accordance with the sixth aspect of the present invention, there is provided a sound data providing method applied to a sound data providing system comprising a sending terminal for sending sound data, an exchange and a receiving terminal for receiving the sound data. The sound data providing method comprises the steps of, in the sending terminal, inputting sound data, transmitting to the exchange various information on the input sound data, transmitting to the exchange destination information that specifies the receiving terminal where the input sound data is to be provided, and transmitting to the exchange date information that specifies the date (time and day) of delivery of the input sound data to the receiving terminal; in the exchange, synthesizing the sound data based on the various information on the sound data received from the sending terminal, and delivering the created sound data to the receiving terminal at the specified date; and, in the receiving terminal, receiving the sound data from the exchange, and outputting the received sound data.

In accordance with the seventh aspect of the present invention, there is provided a sound data providing method applied to a sound data providing system comprising a sending terminal for sending sound data, a user interface, an exchange and a receiving terminal for receiving the sound data. The sound data providing method comprises the steps of, in the sending terminal, inputting sound data, transmitting to the user interface various information on the input sound data, transmitting to the user interface destination information that specifies the receiving terminal where the input sound data is to be provided, and transmitting to the user interface date information that specifies the date of delivery of the input sound data to the receiving terminal; in the user interface, generating related information compatible with the exchange based on the various information, destination information and date information received from the sending terminal, and transmitting the generated related information to the exchange; in the exchange, synthesizing the sound data based on the various information on the sound data extracted from the related information received from the user interface, specifying the receiving terminal where the sound data is to be provided based on the destination information extracted from the related information received from the user interface, specifying the date of delivery of the sound data based on the date information extracted from the related information received from the user interface, and delivering the created sound data to the receiving terminal at the specified date; and in the receiving terminal, receiving the sound data from the exchange, and outputting the received sound data.

In accordance with the eighth aspect of the present invention, the sound data providing method of the sixth or seventh aspect further comprises the steps of inquiring, by the exchange, the receiving terminal whether or not it accepts the sound data; transmitting, by the receiving terminal, data acceptance information as to whether or not to accept the sound data to the exchange; and determining, by the exchange, whether or not to provide the sound data to the receiving terminal based on the data acceptance information received therefrom as a response to the inquiry.

In accordance with the ninth aspect of the present invention, the sound data providing method of one of the sixth to eighth aspects further comprises the step of, in the exchange and/or the receiving terminal, determining whether or not the sound data is acceptable based on identification information of terminals, sound data from which is to be refused, preset in the receiving terminal.

In accordance with the tenth aspect of the present invention, the sound data providing method of one of the sixth to ninth aspects further comprises the step of, in the exchange, calculating fees charged to the sending terminal based on data amount, access time to a communication channel and the like with respect to the sound data provided to the receiving terminal, and charging the sending terminal the fees.

In accordance with the eleventh aspect of the present invention, there is provided an exchange comprising a sound data synthesizer for synthesizing sound data based on various information on the sound data received from a sender, and a sound data delivery section for delivering the sound data created by the sound data synthesizer to a receiver at the specified date based on destination information and date information received from the sender.

In accordance with the twelfth aspect of the present invention, the exchange of the eleventh aspect further comprises a data acceptance determination section for inquiring the receiver whether or not it accepts the sound data to determine whether or not to provide the sound data thereto based on data acceptance information received therefrom as a response to the inquiry.

In accordance with the thirteenth aspect of the present invention, the exchange of the eleventh or twelfth aspect further comprises a reception refusal determination section for determining whether or not the sound data is acceptable based on identification information of other parties, sound data from which is to be refused, preset in the receiver.

In accordance with the fourteenth aspect of the present invention, the exchange of one of the eleventh to thirteenth aspects further comprises an accounting section for calculating fees charged to the receiver based on data amount, access time to a communication channel and the like with respect to the sound data provided to the receiver, and charging the sender the fees.

In accordance with the fifteenth aspect of the present invention, there is provided a program implementing a sound data providing method applied to a sound data providing system comprising a sending terminal for sending sound data, an exchange and a receiving terminal for receiving the sound data. The program causes the sending terminal to perform the steps of inputting sound data, transmitting to the exchange various information on the input sound data, transmitting to the exchange destination information that specifies the receiving terminal where the input sound data is to be provided, and transmitting to the exchange date information that specifies the date (time and day) of delivery of the input sound data to the receiving terminal. The program causes the exchange to perform the steps of synthesizing the sound data based on the various information on the sound data received from the sending terminal, and delivering the created sound data to the receiving terminal at the specified date. The program also causes the receiving terminal to perform the steps of receiving the sound data from the exchange, and outputting the received sound data.

In accordance with the sixteenth aspect of the present invention, there is provided a program implementing a sound data providing method applied to a sound data providing system comprising a sending terminal for sending sound data, a user interface, an exchange and a receiving terminal for receiving the sound data. The program causes the sending terminal to perform the steps of inputting sound data, transmitting to the user interface various information on the input sound data, transmitting to the user interface destination information that specifies the receiving terminal where the input sound data is to be provided, and transmitting to the user interface date information that specifies the date of delivery of the input sound data to the receiving terminal. The program causes the user interface to perform the steps of generating related information compatible with the exchange based on the various information, destination information and date information received from the sending terminal, and transmitting the generated related information to the exchange. The program causes the exchange to perform the steps of synthesizing the sound data based on the various information on the sound data extracted from the related information received from the user interface, specifying the receiving terminal where the sound data is to be provided based on the destination information extracted from the related information received from the user interface, specifying the date of delivery of the sound data based on the date information extracted from the related information received from the user interface, and delivering the created sound data to the receiving terminal at the specified date. The program also causes the receiving terminal to perform the steps of receiving the sound data from the exchange, and outputting the received sound data.

In accordance with the seventeenth aspect of the present invention, the program of the fifteenth or sixteenth aspect further causes the exchange to perform the step of inquiring the receiving terminal whether or not it accepts the sound data, the receiving terminal to perform the step of transmitting to the exchange data acceptance information as to whether or not to accept the sound data, and the exchange to perform the step of determining whether or not to provide the sound data to the receiving terminal based on the data acceptance information received therefrom as a response to the inquiry.

In accordance with the eighteenth aspect of the present invention, the program of one of the fifteenth to seventeenth aspects further causes the exchange and/or the receiving terminal to perform the step of determining whether or not the sound data is acceptable based on identification information of terminals, sound data from which is to be refused, preset in the receiving terminal.

In accordance with the nineteenth aspect of the present invention, the program of one of the fifteenth to eighteenth aspects further causes the exchange the steps of calculating fees charged to the sending terminal based on data amount, access time to a communication channel and the like with respect to the sound data provided to the receiving terminal, and charging the sending terminal the fees.

As is described above, in accordance with the present invention, it is possible to improve the freedom of creation of sound data provided from a sending terminal to a receiving terminal.

BRIEF DESCRIPTION OF THE DRAWINGS

The exemplary aspects and features of the present invention will become more apparent from the consideration of the following detailed description taken in conjunction with the accompanying drawings in which:

FIG. 2(*b*) is a block diagram showing the construction of a receiving terminal depicted in FIG. 1;

FIG. 3 is a block diagram showing the construction of a user interface depicted in FIG. 1;

FIG. 4 is a block diagram showing the construction of an exchange depicted in FIG. 1;

FIG. 5 is a flowchart showing the operation of the sound data providing system when the sending terminal transmits sound data and the like to the user interface;

FIG. 6 is a flowchart showing the operation of the sound data providing system when the user interface transmits related information and the like to the exchange.

DESCRIPTION OF THE PREFERRED EMBODIMENT

Figure 1:
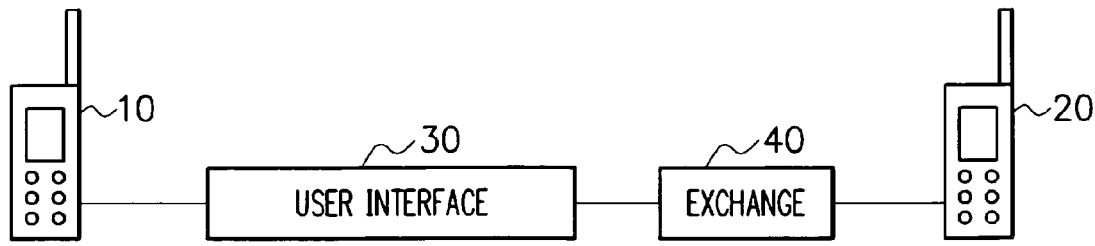
FIG. 1 is a diagram showing the construction of a sound data providing system according to an embodiment of the present invention.

Referring now to the drawings, a description of a preferred embodiment of the present invention will be given in detail.

FIG. 1 is a diagram showing the construction of a sound or audio data providing system according to an embodiment of the present invention. As shown in FIG. 1, the sound data providing system comprises a sending terminal 10, a receiving terminal 20, a user interface 30 and an exchange 40.

The sending terminal 10 is an apparatus used to transmit various information concerning created or generated sound or audio data to the user interface 30. Examples of the sending terminal 10 include a PC (Personal Computer), a fixed telephone, a cellular phone, a PHS (Personal Handyphone System), and a portable information terminal. The sending terminal 10 may perform wired or wireless communication including wireless LAN (Local Area Network) communication, Bluetooth communication and infrared data communication.

Incidentally, "sound data" as used herein indicates data of all kinds of sound including human voice, music or melody, nature sounds such as wind, waves, etc., and digital sound generated by an information processor.

Figure 2A:
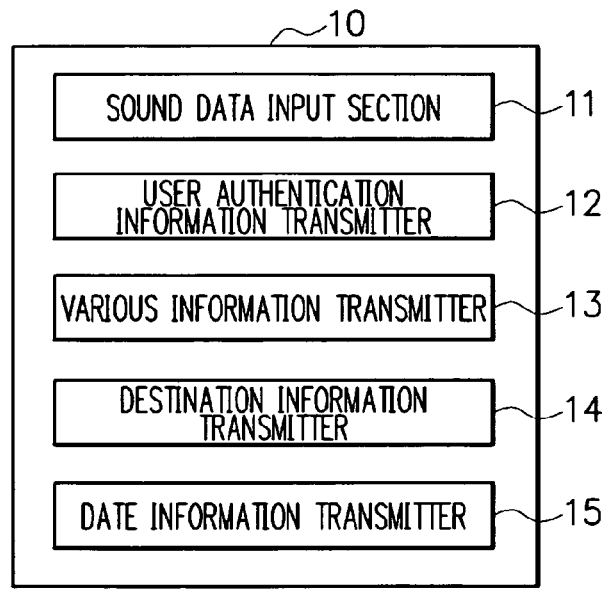
FIG. 2(*a*) is a block diagram showing the construction of a sending terminal depicted in FIG. 1.

FIG. 2(*a*) is a block diagram showing the construction of the sending terminal 10. Referring to FIG. 2(*a*), the sending terminal 10 includes a sound data input section 11, a user authentication information transmitter 12, a various information transmitter 13, a destination information transmitter 14, and a date information transmitter 15.

The sound data input section 11 is used to input sound data. The sound data input section 11 may be, for example, the mouthpiece of a telephone, the digital sound data input unit of a PC or the like.

The user authentication information transmitter 12 transmits to the user interface 30 user authentication information that uniquely identifies a user. Examples of the user authentication, information include user ID and password.

The various information transmitter 13 transmits various information concerning the input sound data to the user interface 30. The various information indicates such information as to specify sound quality, sound pitch, sound volume and the like.

The destination information transmitter 14 transmits to the user interface 30 destination information that specifies a destination where the input sound data is to be provided. The destination information may be, for example, a telephone number or identification information such as URL (Uniform Resource Locater).

The date information transmitter 15 transmits to the user interface 30 date information that specifies the date (time and day) of delivery of the input sound data to the receiving terminal 20.

The receiving terminal 20 is an apparatus used to receive sound data from the exchange 40. Examples of the receiving terminal 20 include a fixed telephone, a cellular phone, and a PHS. Preferably, but not necessarily, the receiving terminal 20 is an apparatus uniquely identified by telephone number information. The receiving terminal 20 may be an apparatus that is identified by identification information other than telephone number information.

Figure 2B:
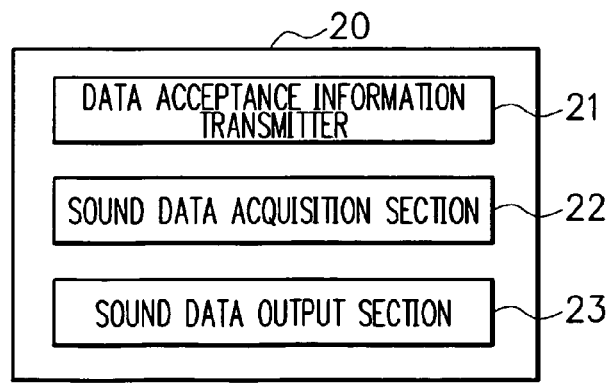

FIG. 2(b) is a block diagram showing the construction of the receiving terminal 20. Referring to FIG. 2(b), the receiving terminal 20 includes a data acceptance information transmitter 21, a sound data acquisition section 22, and a sound data output section 23.

The data acceptance information transmitter 21 transmits to the exchange 40 data acceptance information as to whether or not to accept sound data. Whether or not sound data is acceptable can be determined depending on the sender of the sound data. This function is especially advantageous in avoiding nuisance or spam messages.

The sound data acquisition section 22 receives sound data from the exchange 40.

The sound data output section 23 reproduces the sound data received from the exchange 40. The sound data output section 23 may be, for example, the earpiece of a telephone, the output unit of a PC such as a speaker or the like.

The user interface 30 receives various information concerning sound data provided through the sending terminal 10 by the user, and forwards the information to the exchange 40. For example, the user interface 30 may be a web server if connected to an information processor via a network such as the Internet, or may be a WAP (Wireless Application Protocol) server if connected to a mobile terminal via a mobile communication network. Further, the user interface 30 may be an IVR (Interactive Voice Response) server if connected to a telephone via a voice or telephone network.

FIG. 3 is a block diagram showing the construction of the user interface 30. Referring to FIG. 3, the user interface 30 includes a user authentication section 31, a various information acquisition section 32, a destination information acquisition section 33, a date information acquisition section 34, a related information generator 35, and a related information transmitter 36.

The user authentication section 31 authenticates a user based on user authentication information received from the sending terminal 10.

The various information acquisition section 32 receives various information from the sending terminal 10.

The destination information acquisition section 33 receives destination information from the sending terminal 10.

The date information acquisition section 34 receives date information from the sending terminal 10.

The related information generator 35 generates related information in a data format compatible with the exchange 40 based on the various information, destination information and date information. Generally, the sending terminal 10 hardly transmits data in a data format compatible with the exchange 40, and therefore, the user interface 30 is required to convert the data format.

The related information transmitter 36 transmits to the exchange 40 the related information generated by the related information generator 35.

The exchange 40 is an information processor that receives various information concerning sound data from the user interface 30, and provides the sound data to the receiving terminal 20.

FIG. 4 is a block diagram showing the construction of the exchange 40. Referring to FIG. 4, the exchange 40 includes a related information acquisition section 41, a sound data synthesizer 42, a destination specification section 43, a date specification section 44, a data acceptance determination section 45, a sound data delivery section 46, a reception refusal determination section 47, and an accounting section 48.

The related information acquisition section 41 receives related information from the user interface 30.

The sound data synthesizer 42 synthesizes sound data based on information on sound quality, sound pitch, sound volume and the like with respect to the sound data extracted from the related information.

The destination specification section 43 specifies a receiving terminal where the sound data is to be provided based on destination information extracted from the related information.

The date specification section 44 specifies the date of delivery of the sound data based on date information extracted from the related information.

The data acceptance determination section 45 inquires the receiving terminal 20 whether or not it accepts the sound data, and receives data acceptance information therefrom as a response to the inquiry. Based on the data acceptance information, the data acceptance determination section 45 determines whether or not to provide the sound data to the receiving terminal 20.

The sound data delivery section 46 delivers the sound data created by the sound data synthesizer 42 to the receiving terminal 20 at the specified date.

The reception refusal determination section 47 determines whether or not the sound data is acceptable based on identification information of terminals, sound data from which is to be refused, preset in the receiving terminal 20.

The accounting section 48 calculates fees charged to the user of the sending terminal 10 based on data amount, access time to a communication channel and the like with respect to the sound data provided to the receiving terminal 20, and charging the sending terminal 10 the fees. The payment may be made by direct debit, credit card or the like.

The exchange 40 may be an apparatus used in the conventional telephone answering service. When the terminal 10 makes a call to the receiving terminal 20, such an apparatus receives a circuit-switched call control signal containing information, as, for example, a destination number input by the sending terminal 10 and the source number of the terminal 10. The apparatus then connects the call to the receiving terminal 20. When the receiving terminal 20 can answer the call, the terminal 20 receives the call and the user has a conversation with the caller. On the other hand, when the receiving terminal 20 is inaccessible and the telephone answering service or voice mail service is on, the apparatus activates the telephone answering service to announce guidance for the sending terminal 10 to record a message. According to the guidance, the user of the sending terminal 10 or the sender produces a message to the receiving terminal 20 through the terminal 10. The apparatus records the message, and disconnects the communication. After that, the apparatus reproduces the message in response to a request from the receiving terminal 20.

If it is assumed that the sending terminal 10 is a fixed telephone, while the receiving terminal 20 is a mobile communication terminal such as a cellular phone, the terminals 10 and 20 may be connected to the exchange 40 via a fixed telephone network and a mobile telephone network, respectively. In this case, the fixed telephone network may be configured with, for example, one or more fixed telephones each connected to a subscriber exchange via a subscriber line. The subscriber exchange is connected to a relay exchange via a relay transmission line, and the relay exchange is connected to a gate exchange that serves as an intermediary between fixed and mobile communication carriers or providers. Besides, the mobile telephone network may be configured with, for example, a plurality of base stations each covering an area called a cell. The base station receives radio waves from cellular phones or the like in the cell. The base station is connected to an exchange via a relay transmission line, and the exchange is connected to a gate exchange via a relay transmission line. The location memory is also connected to the exchange via a relay transmission line. In the location memory may be automatically registered location information as to a cell where each cellular phone or the like is located according to the communication of the phone.

In the following, a description will be given in detail of the operation of the sound data providing system of this embodiment.

FIG. 5 is a flowchart showing the operation of the sound data providing system when the sending terminal 10 transmits sound data and the like to the user interface 30. Referring to FIG. 5, the operation of the sending terminal 10 and the user interface 30 will be described.

First, sound data is input through the sound data input section 11 of the sending terminal 10 (step S501). The user may input his/her voice as the sound data through the mouthpiece of a telephone, or digital sound data to the prescribed input unit of a PC.

Incidentally, if a cellular phone or the like is employed as the sending terminal 10, and sound data is created by a PC or the like, sophisticated processing can be implemented. Further, it is possible to improve the freedom of creation of sound data.

Sound data may be in various formats. Examples of sound data include a message directly input through the mouthpiece of a telephone, a message in a voice that the user prefers synthesized according to the designation of desired message text, and the tone, pitch, etc. of the synthesized sound provided through a cellular phone, a PC or the like, a message with BGM, laugh track, etc. previously prepared in the user interface 30 or the exchange 40, and MIDI (Musical Instrument Digital Interface) data previously created by a cellular phone, a PC or the like. These sound data are available in combination, which enables the creation or provision of sound data with high degree of freedom.

Next, the user authentication information transmitter 12 of the sending terminal 10 transmits to the user interface 30 information such as a user ID and password that uniquely identify the user (step S502). Having received the user authentication information, the user authentication section 31 of the user interface 30 refers to a prescribed database where sending user information has been registered in advance to authenticate the user based on the user authentication information (step S503).

If the user is authenticated, the various information transmitter 13 of the sending terminal 10 transmits to the user interface 30 various information concerning the sound data input through the sound data input section 11 (step S504).

Incidentally, the input sound data itself may be transmitted to the user interface 30. However, there are a variety of formats, parameters and the like for sound data, and, in consideration of differences in them, such information as sound quality, sound pitch, sound volume, etc. with respect to the sound data is transmitted.

The various information acquisition section 32 of the user interface 30 obtains the various information transmitted from the sending terminal 10 (step S505).

The destination information transmitter 14 of the sending terminal 10 obtains destination information that specifies the receiving terminal where the input sound data is to be provided, such as a telephone number, to transmit the information to the user interface 30 (step S506). The destination information acquisition section 33 of the user interface 30 obtains the destination information transmitted from the sending terminal 10 (step S507).

The date information transmitter 15 of the sending terminal 10 obtains date information that specifies the date (time and day) of delivery of the input sound data to the receiving terminal 20 to transmit the information to the user interface 30 (step S508). The date information acquisition section 34 of the user interface 30 obtains the date information transmitted from the sending terminal 10 (step S509).

FIG. 6 is a flowchart showing the operation of the sound data providing system when the user interface 30 transmits related information and the like to the exchange 40. Referring to FIG. 6, the operation of the user interface 30 and the exchange 40 will be described.

The related information generator 35 of the user interface 30 generates related information in a data format compatible with the exchange 40 based on the various information, destination information and date information received from the sending terminal 10 (step S601). On this occasion, the related information generator 35 may store the various information, destination information and date information in respective tables of a prescribed database, and convert each data to a data format acceptable to the exchange 40 according to predetermined conversion rules.

After that, the related information transmitter 36 of the user interface 30 transmits the generated related information to the exchange 40 (step S602). The related information acquisition section 41 of the exchange 40 receives the related information from the user interface 30 (step S603).

Incidentally, if the user interface 30 and the exchange 40 handle the same data, and either one has the functions of both of them, they need not be separately configured. In other words, the user interface 30 and the exchange 40 may be implemented by a single apparatus.

Figure 7:
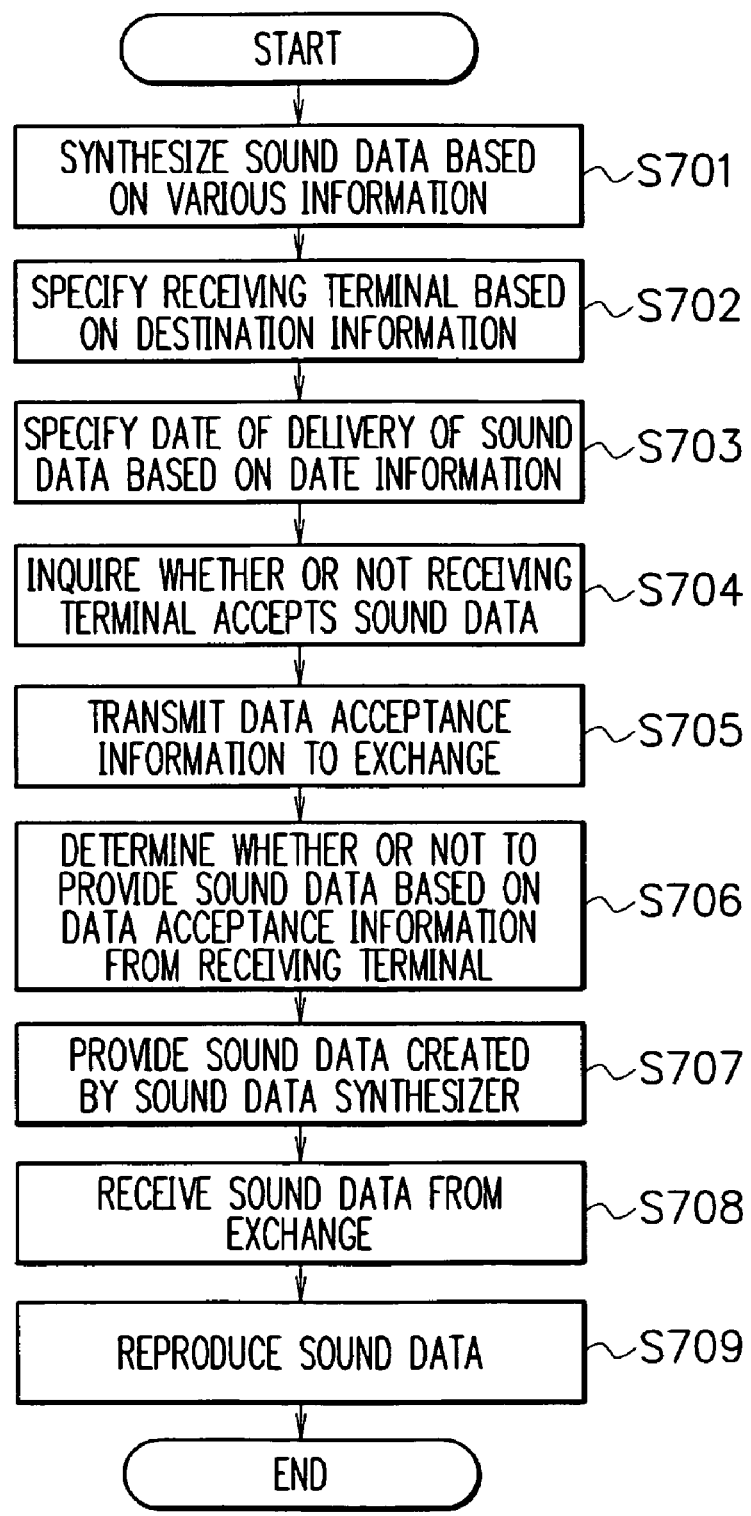
FIG. 7 is a flowchart showing the operation of the sound data providing system when the exchange provides the sound data to the receiving terminal.

FIG. 7 is a flowchart showing the operation of the sound data providing system when the exchange 40 provides sound data to the receiving terminal 20. Referring to FIG. 7, the operation of the exchange 40 and the receiving terminal 20 will be described.

The sound data synthesizer 42 of the exchange 40 synthesizes the sound data based on the information on sound quality, sound pitch, sound volume and the like with respect to the sound data extracted from the related information (step S701). On this occasion, the sound data synthesizer 42 may once store the related information in a table of a prescribed database, and synthesizes the sound data based on the data according to predetermined conversion rules.

The destination specification section 43 of the exchange 40 specifies the receiving terminal 20 where the sound data is to be provided based on the destination information extracted from the related information (step S702).

Incidentally, in the conventional system, only one terminal can be specified as a receiving terminal. Meanwhile, in the sound data providing system of this embodiment, a plurality of terminals can be specified. Thereby, the sound data providing system is applicable to broadcast or multicast services. Additionally, the sending terminal 10 can specify itself as a receiving terminal. Thus, the sound data providing system is also applicable to schedule management or the like.

The date specification section 44 of the exchange 40 specifies the date of delivery of the sound data based on the date information extracted from the related information (S703). Such setting may be made that, if the receiving terminal 20 is a cellular phone or the like and inaccessible at the specified date, the sound data is retransmitted to the terminal 20 in prescribed timing.

The data acceptance determination section 45 of the exchange 40 inquires the receiving terminal 20 whether or not it accepts the sound data at the specified date (step S704).

Having received the inquiry, the data acceptance information transmitter 21 transmits to the exchange 40 data acceptance information as to whether or not to accept the sound data (step S705). For example, data from an unknown third party or nuisance or spam messages can be refused.

Based on the data acceptance information from the receiving terminal 20, the data acceptance determination section 45 of the exchange 40 determines whether or not to provide the sound data thereto (step S706).

If it has been determined that the sound data is to be provided, the sound data delivery section 46 of the exchange 40 delivers the sound data created by the sound data synthesizer 42 to the receiving terminal 20 (step S707).

The sound data acquisition section 22 of the receiving terminal 20 receives the sound data from the exchange 40 (step S708). The sound data output section 23 of the receiving terminal 20 outputs or reproduces the received sound data through, for example, the earpiece of a telephone, the speaker of a PC or the like (step S709).

Incidentally, before the delivery of the sound data in step S707, the reception refusal determination section 47 of the exchange 40 may determine whether or not the sound data is acceptable based on identification information of terminals, sound data from which is to be refused, preset in the receiving terminal 20. The reception refusal determination section 47 may have a function capable of making the setting to refuse a message from the telephone number of a user who sends nuisance or spam messages to a receiving terminal. The exchange 40 may inform a receiving terminal of a message with the telephone number of a user who has registered the message, and the receiving terminal may refuse the message from the telephone number with the reception refusal function. In the case where a carrier offers this service, strict user authentication is performed when the telephone number is provided as compared to the case where a specific service provider offers a service similar to this service. Thus, the reception refusal service can be relatively facilitated. More specifically, in the case where a specific service provider offers a service similar to this service, user registration can be performed very easily. Therefore, it is difficult to offer the effective reception refusal service.

Besides, the accounting section 48 of the exchange 40 calculates fees charged to the user of the sending terminal 10 based on data amount, access time to a communication channel and the like with respect to the sound data provided to the receiving terminal 20, and charging the sending terminal 10 the fees. The payment may be made by direct debit, credit card or the like. In the case where a carrier offers this service, it is possible to make a charge by simple process as compared to the case where a specific service provider offers a service similar to the service. This is because the charge for the use of this service can be made with, for example, an ordinary telephone charge, and there is no need to repeat the charging procedure. Generally, the user of the sending terminal 10 is charged when the receiving terminal 20 receives the sound data. However, as with a collect call, if the user of the receiving terminal 20 accepts a charge thereto, the receiving terminal 20 may be charged as an optional service.

With the sound data providing system of this embodiment, even when, for example, the user of the sending terminal 10 wishes to send a message to the user of the receiving terminal 20 at 0:00 a.m. on the birthday of the user of the terminal 20, but he/she has something to do at the time and will have some difficulty to make a call, he/she can provide the user of the terminal 20 with sound data of the message. In order to send the message, the user of the sending terminal 10 designates 0:00 a.m. on the birthday of the user of the receiving terminal 20 as specified date, and records his/her message through the mouthpiece of a telephone. The user of the sending terminal 10 may select happy birthday song as BGM, and insert clap track at the end of the song.

While one preferred embodiment of the present invention has been shown, it is not so limited but is susceptible of various changes and modifications without departing from the scope and spirit of the present invention. For example, a program may be executed in each of the sending terminal 10, the receiving terminal 20, the user interface 30 and the exchange 40 to implement the functions of the sound data providing system. The program may be fed to another computer system through a transmission medium such as the Internet and a telephone line by transmission waves or a computer readable storage medium such as a CD-ROM (Compact Disc Read Only Memory) and a magnetic optical disk.

In the embodiment described above, the sound data providing system has a construction in which the separate sending terminal 10, user interface 30 and exchange 40 are connected to one another. However, the sending terminal 10, user interface 30 and exchange 40 may be implemented as one computer system, or a plurality of servers or the like may be added to each of them.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A sound data providing system comprising a sending terminal that sends sound data, a user interface, an exchange and a receiving terminal that receives the sound data, which are connected to one another, wherein:
   the sending terminal includes:
   a sound data input section that inputs sound data;
   a various information transmitter that transmits to the user interface various information on the sound data input through the sound data input section;
   a destination information transmitter that transmits to the user interface destination information that specifies the receiving terminal where the input sound data is to be provided; and
   a date information transmitter that transmits to the user interface date information that specifies the date of delivery of the input sound data to the receiving terminal;
   the user interface includes:
   a related information generator that generates related information compatible with the exchange based on the various information, destination information and date information received from the sending terminal; and a related information transmitter that transmits to the exchange the related information generated by the related information generator;
the exchange includes:
a sound data synthesizer that synthesizes the sound data based on the various information on the sound data extracted from the related information received from the user interface;
a destination specification section that specifies the receiving terminal where the sound data is to be provided based on the destination information extracted from the related information received from the user interface:
a date specification section that specifies the date of delivery of the sound data based on the date information extracted from the related information received from the user interface; and
a sound data delivery section that delivers the sound data created by the sound data synthesizer to the receiving terminal at the specified date; and
the receiving terminal includes:
a sound data acquisition section that receives the sound data from the exchange; and
a sound data output section that outputs the sound data received by the sound data acquisition section, wherein:
the exchange further includes a data acceptance determination section that inquires whether or not the receiving terminal accepts the sound data to determine whether or not to provide the sound data thereto based on data acceptance information received therefrom as a response to the inquiry;
the receiving terminal further includes a data acceptance information transmitter that transmits to the exchange the data acceptance information as to whether or not to accept the sound data; and
at least any of the exchange and the receiving terminal further includes a reception refusal determination section that determines whether or not the sound data is acceptable based on identification information of terminals preset in the receiving terminal from which the sound data is to be refused.

2. A sound data providing method applied to a sound data providing system comprising a sending terminal that sends sound data, a user interface, an exchange and a receiving terminal that receives the sound data, the method comprising the steps of:
in the sending terminal:
inputting sound data;
transmitting to the user interface various information on the input sound data;
transmitting to the user interface destination information that specifies the receiving terminal where the input sound data is to be provided; and
transmitting to the user interface date information that specifies the date of delivery of the input sound data to the receiving terminal;
in the user interface:
generating related information compatible with the exchange based on the various information, destination information and date information received from the sending terminal; and
transmitting the generated related information to the exchange;
in the exchange:
synthesizing the sound data based on the various information on the sound data extracted from the related information received from the user interface;
specifying the receiving terminal where the sound data is to be provided based on the destination information extracted from the related information received from the user interface;
specifying the date of delivery of the sound data based on the date information extracted from the related information received from the user interface; and
delivering the created sound data to the receiving terminal at the specified date; and
in the receiving terminal:
receiving the sound data from the exchange; and
outputting the received sound data;
inquiring, by the exchange, whether or not the receiving terminal accepts the sound data;
transmitting, by the receiving terminal, data acceptance information as to whether or not to accept the sound data to the exchange;
determining, by the exchange, whether or not to provide the sound data to the receiving terminal based on the data acceptance information received therefrom as a response to the inquiry; and
in at least any of the exchange and the receiving terminal, determining whether or not the sound data is acceptable based on identification information of terminals preset in the receiving terminal from which the sound data is to be refused.

3. A tangible computer-readable storage medium implementing a sound data providing method applied to a sound data providing system comprising a sending terminal that sends sound data, a user interface, an exchange and a receiving terminal that receives the sound data, the computer-readable storage medium causing:
the sending terminal to perform the steps of:
inputting sound data;
transmitting to the user interface various information on the input sound data;
transmitting to the user interface destination information that specifies the receiving terminal where the input sound data is to be provided; and
transmitting to the user interface date information that specifies the date of delivery of the input sound data to the receiving terminal;
the user interface to perform the steps of:
generating related information compatible with the exchange based on the various information, destination information and date information received from the sending terminal; and
transmitting the generated related information to the exchange;
the exchange to perform the steps of:
synthesizing the sound data based on the various information on the sound data extracted from the related information received from the user interface;
specifying the receiving terminal where the sound data is to be provided based on the destination information extracted from the related information received from the user interface;
specifying the date of delivery of the sound data based on the date information extracted from the related information received from the user interface; and
delivering the created sound data to the receiving terminal at the specified date; and the receiving terminal to perform the steps of:
  receiving the sound data from the exchange; and
  outputting the received sound data;
the exchange to perform the step of inquiring terminal whether or not the receiving accepts the sound data;
the receiving terminal to perform the step of transmitting to the exchange data acceptance information as to whether or not to accept the sound data;
the exchange to perform the step of determining whether or not to provide the sound data to the receiving terminal based on the data acceptance information received therefrom as a response to the inquiry; and
at least any of the exchange and the receiving terminal to perform the step of determining whether or not the sound data is acceptable based on identification information of terminals preset in the receiving terminal from which the sound data is to be refused.

* * * * *